United States Patent
Sevenster et al.

(10) Patent No.: US 10,497,157 B2
(45) Date of Patent: Dec. 3, 2019

(54) GROUPING IMAGE ANNOTATIONS

(71) Applicant: KONINKLIJKE PHILIPS N.V., Eindhoven (NL)

(72) Inventors: Merlijn Sevenster, Chicago, IL (US); Joost Frederik Peters, Best (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 821 days.

(21) Appl. No.: 14/782,689

(22) PCT Filed: Apr. 17, 2014

(86) PCT No.: PCT/EP2014/057889
§ 371 (c)(1),
(2) Date: Oct. 6, 2015

(87) PCT Pub. No.: WO2014/170431
PCT Pub. Date: Oct. 23, 2014

(65) Prior Publication Data
US 2016/0048987 A1    Feb. 18, 2016

Related U.S. Application Data (60) Provisional application No. 61/813,676, filed on Apr. 19, 2013.

(30) Foreign Application Priority Data

Jun. 7, 2013    (EP) .................................... 13171060

(51) Int. Cl.
*G06F 17/20*    (2006.01)
*G06T 11/60*    (2006.01)
(Continued)

(52) U.S. Cl.
CPC ............ *G06T 11/60* (2013.01); *G06F 17/241* (2013.01); *G06T 7/0012* (2013.01); *G06T 7/38* (2017.01);
(Continued)

(58) Field of Classification Search
CPC ......... G06T 11/60; G06T 7/38; G06T 7/0012; G06T 15/08; G06F 17/241; G06K 9/46
(Continued)

(56) References Cited

U.S. PATENT DOCUMENTS 7,131,060 B1    10/2006    Azuma
7,453,472 B2    11/2008    Goede et al.
(Continued)

FOREIGN PATENT DOCUMENTS

CN    102436583 A    5/2012
JP    2009080545 A    4/2009

OTHER PUBLICATIONS

Muehler, K. et al., "Automatic textual annotation for surgical planning", Conference Paper, VMV, Jan. 2009.
(Continued)

*Primary Examiner* — Mohammed H Zuberi (57) ABSTRACT

A system for grouping image annotations is disclosed. A display unit (1) is arranged for displaying a plurality of medical images relating to a subject (5) comprising a representation of an anatomical object. An annotation unit (2) is arranged for receiving information regarding input of a plurality of annotations (3) of the plurality of medical images via a user interface (4), wherein each annotation comprises geometric information relative to an image of the plurality of medical images. A grouping unit (4) is arranged for detecting a group of annotations among the plurality of annotations, based on the geometric information and a set of rules that define general properties of geometric relation-
(Continued)

ships of annotations (3) that belong to the same object. The detecting of the group of annotations is further based on a geometric relationship between the plurality of medical images.

20 Claims, 5 Drawing Sheets

(51) Int. Cl.
    *G06F 17/24*     (2006.01)
    *G06T 7/00*     (2017.01)
    *G06T 7/60*     (2017.01)
    *G06T 7/38*     (2017.01)

(52) U.S. Cl.
    CPC ...... *G06T 7/60* (2013.01); *G06T 2207/10016* (2013.01); *G06T 2207/10072* (2013.01); *G06T 2207/10116* (2013.01); *G06T 2207/30004* (2013.01)

(58) Field of Classification Search
    USPC .......................................................... 715/232
    See application file for complete search history.

(56) References Cited

U.S. PATENT DOCUMENTS

| | | |
|---|---|---|
| 7,703,001 B2 | 4/2010 | Takaai et al. |
| 8,111,884 B2 | 2/2012 | Guendel et al. |
| 2008/0136838 A1 | 6/2008 | Goede et al. |
| 2008/0184168 A1 | 7/2008 | Oda |
| 2009/0092299 A1 | 4/2009 | Jerebko et al. |
| 2010/0034442 A1 | 2/2010 | Minakuchi et al. |
| 2010/0284590 A1* | 11/2010 | Peng ................ A61B 6/032 382/128 |
| 2011/0002515 A1* | 1/2011 | Futami ............. G06F 19/321 382/128 |
| 2011/0137156 A1* | 6/2011 | Razzaque .......... A61B 18/1477 600/424 |
| 2012/0075433 A1 | 3/2012 | Tatzgern et al. |
| 2013/0135307 A1* | 5/2013 | Kawasaki ............. G06T 15/08 345/424 |
| 2013/0290826 A1 | 10/2013 | Niwa et al. |
| 2014/0292814 A1 | 10/2014 | Tsujimoto et al. |

OTHER PUBLICATIONS

Tarek, M.M. et al "Textual labeling of segmented structures in 2D CT slice views", Computers and Information Technology, 2009, ICCIT '09, 12th International Conference on, IEEE, NJ, Dec. 21, 2009, pp. 477-482.

Sawant, H.K. et al, "An Effective Image-Text Association Algorithm to Retrieve Data from Multimedia Web Documents", International Journal of Computer Technology and Electronics Engineering, vol. 1, Issue 2, p. 178-182, 2011.

Minka, T.P. et al. "An image database browser that learns from user interaction". Diss. Massachusetts Institute of Technology, Dept. of Electrical Engineering and Computer Science, 1996.

Carrer, M. et al., "An Annotation Engine for Supporting Video Database Population", Multimedia Tools and Applications, Nov. 1997, vol. 5, Issue 3, pp. 233-258.

* cited by examiner

GROUPING IMAGE ANNOTATIONS

CROSS-REFERENCE TO PRIOR APPLICATIONS

This application is the U.S. National Phase application under 35 U.S.C. § 371 of International Application No. PCT/EP2014/057889, filed on Apr. 17, 2014, which claims the benefit of U.S. Provisional Application No. 61/813,676 or European Patent Application No. 13171060.0, filed on Apr. 19, 2013 and filed on Jun. 7, 2013. These applications are hereby incorporated by reference herein.

FIELD OF THE INVENTION

The invention relates to grouping image annotations, in particular image annotations made during review of medical images in a radiological exam.

BACKGROUND OF THE INVENTION

In the course of reading a radiological exam, radiologists can make annotations on an image using a computer workstation. For example, an annotation can be added to an image to visualize a measurement of a particular object represented by the image, or point to a particular structure of interest. For example, the annotations can comprise symbols, such as arrows or other symbols, and/or text strings.

For example, the annotations may be superimposed on the digital image and stored together with the image as a bitmap. Alternatively, the annotations may be stored as separate digital objects together with the original image; for example, as a presentation state. A snapshot of an annotated image may be stored in a radiology report document, for example.

WO 2004/057439 (A2) describes a method and system for visually annotating an image. It is said that annotations and notes to images, such as digital medical and healthcare images, may be stored in a structured vector representation alongside image information in a single, non-volatile and portable file or in a separate file from the image. The annotations may be composed of point, line and polygon drawings and text symbols, labels or definitions and captions or descriptions. The annotations may be structured in a manner that facilitates grouping and manipulation as user defined groups.

SUMMARY OF THE INVENTION

It would be advantageous to have an improved system for making annotations of images. To better address this concern, a first aspect of the invention provides a system for grouping image annotations. The system comprises a display unit for displaying a plurality of medical images relating to a subject on a display screen, wherein the plurality of medical images comprises a representation of at least one anatomical object; and an annotation unit for receiving, from a user, input relating to the plurality of medical images, and creating, from said input, one or more annotations across the plurality of medical images, each annotation comprising geometric information;

a grouping unit for detecting a group of annotations among said one or more annotations, the detecting including processing said geometric information based on a set of rules that define properties of geometric relationships of annotations that belong to a single anatomical object and based on a geometric relationship between the plurality of medical images.

The system allows grouping the annotations that belong to the same object, even if they are drawn on different related images of an image dataset. It is even possible to group annotations on related images of different image datasets relating to a single patient. This adds structure to the annotations without need for help from the user. Such structure may help to make the information contained in the annotations machine accessible and facilitates the automatic processing of annotations and automated extraction of information of annotations. The rules may define general properties of geometric relationships of annotations that belong to a single anatomical object. For example, the rules may be adapted to the sizes and shapes of anatomical objects that frequently occur in medical images in a particular healthcare domain. Thus, the system automatically groups two or more annotations that appear to belong to the same object, based on the rules.

The display unit may be arranged for displaying an indication of which annotations belong to the group. This is a useful application of the grouping, because it allows seeing which annotations belong together. Moreover, it allows the user to verify the correctness of the grouping. Moreover, the system may provide the indication as immediate feedback to the user when the user provides further input.

The geometric information may comprise a position of the annotation with respect to the medical image and/or an orientation of the annotation with respect to the medical image and/or a shape of the annotation These types of geometric information allow the use of highly relevant rules that can be used to determine the groups.

The grouping unit may comprise a geometric unit arranged for determining a geometric relationship between at least two annotations that are associated with different medical images, based on the geometric relationships between the different medical images and the geometric information of said at least two annotations. This provides an advantageous implementation option of the grouping unit.

The annotation unit may further be arranged for receiving time information indicative of a time of input of at least two annotations of the plurality of annotations. The grouping unit may be arranged for performing the detecting further based on the time information. This makes the detection more reliable, as the time delay between the creation of annotations may be an indicator of whether the annotations belong to the same object.

The grouping unit may comprise a region unit for determining a first region around a first annotation and a second region around a second annotation, based on the geometric information, and an overlap unit for determining an overlap region of the first region and the second region. The grouping unit may be arranged for performing the detecting of the group of annotations based on a size of the overlap region. This allows the grouping to be performed based on rules that take into account the overlap region, which was found to provide a basis for relevant rules.

The geometric information of a first annotation may comprise an indication of a first line and the geometric information of a second annotation may comprise an indication of a second line. The grouping unit may be arranged for detecting whether the first annotation and the second annotation belong to the same group based on a location of an intersection point of the first line and the second line. The defined intersection point was found to provide relevant information to determine whether annotations belong to the same group.

The annotation unit may be arranged for receiving information regarding input of a text annotation comprising a text string, and a plurality of non-text annotations. Each non-text annotation may comprise a symbol. The grouping unit may be arranged for detecting a non-text annotation that is closest to the text annotation, based on the geometric information, and grouping the text annotation with the closest non-text annotation of the plurality of non-text annotations. This was found to be an appropriate rule for grouping text annotations with non-text annotations.

The plurality of medical images may comprise differently oriented reconstructed planes having a known geometric relationship. In neurology magnetic resonance (MR) exams, and other types of exams, it is fairly standard that annotations are made in differently oriented reconstructed planes. If a radiologist wants to assess the volume of a lesion, for instance, the radiologist can make measurements in three dimensions, using two different reconstructed planes. Accordingly, the annotations resulting from such measurements may be grouped across such differently oriented reconstructed planes.

The plurality of medical images may be constituted by two images series. Moreover, the system may comprise a registration unit for registering the two image series to obtain the geometric relationship between the plurality of medical images. As such, the set of rules can be applied as if the annotations were made on the same series. For example, two image series made of the same patient may be registered to obtain the geometric relationship between the two image series. Annotations made in respective ones of these two image series may be grouped using the geometric relationship between the two image series.

The grouping unit may be arranged for detecting the group of annotations based on annotations being positioned at similar coordinates in the plurality of medical images. Accordingly, annotations made with respect to corresponding slices of different image series may belong together if they are positioned at similar coordinates within the images, and particularly so if they are further comparable in size and/or shape.

The set of rules may define properties of geometric relationships of annotations that belong to a single clinical finding.

In another aspect of the invention, a workstation comprises a system as set forth hereinabove.

In another aspect of the invention, a method of grouping image annotations is provided. The method comprises displaying a plurality of medical images relating to a subject on a display screen, wherein the plurality of medical images comprises a representation of at least one anatomical object;

receiving, from a user, input relating to the plurality of medical images, and creating, from said input, one or more annotations across the plurality of medical images, wherein each annotation comprises geometric information; and detecting a group of annotations among the plurality of annotations, based on the geometric information and a set of rules that define properties of geometric relationships of annotations that belong to the same object and based on a geometric relationship between the plurality of medical images.

In another aspect, the invention provides a computer program product comprising instructions for causing a processor system to perform the method set forth.

In another aspect, a system may be provided comprising
a display unit for displaying at least one image on a display screen, wherein the at least one image comprises a representation of at least one object; and
an annotation unit for receiving, from a user, input relating to said at least one image, and creating, from said input, one or more annotations, each annotation comprising geometric information;
a grouping unit for detecting a group of annotations among said one or more annotations, the detecting including processing said geometric information based on a set of rules that define properties of geometric relationships of annotations that belong to a single object.

In another aspect, a method may be provided comprising
displaying at least one image on a display screen, wherein the at least one image comprises a representation of at least one object;
receiving information regarding input of a plurality of annotations of said at least one image, wherein each annotation comprises geometric information relative to an image of said at least one image; and
detecting a group of annotations among the plurality of annotations, based on the geometric information and a set of rules that define properties of geometric relationships of annotations that belong to the same object.

It will be appreciated by those skilled in the art that two or more of the above-mentioned embodiments, implementations, and/or aspects of the invention may be combined in any way deemed useful.

Modifications and variations of the workstation, the method, and/or the computer program product, which correspond to the described modifications and variations of the system, can be carried out by a person skilled in the art on the basis of the present description.

BRIEF DESCRIPTION OF THE DRAWINGS

These and other aspects of the invention are apparent from and will be elucidated hereinafter with reference to the drawings.

DETAILED DESCRIPTION OF EMBODIMENTS

Figure 1:
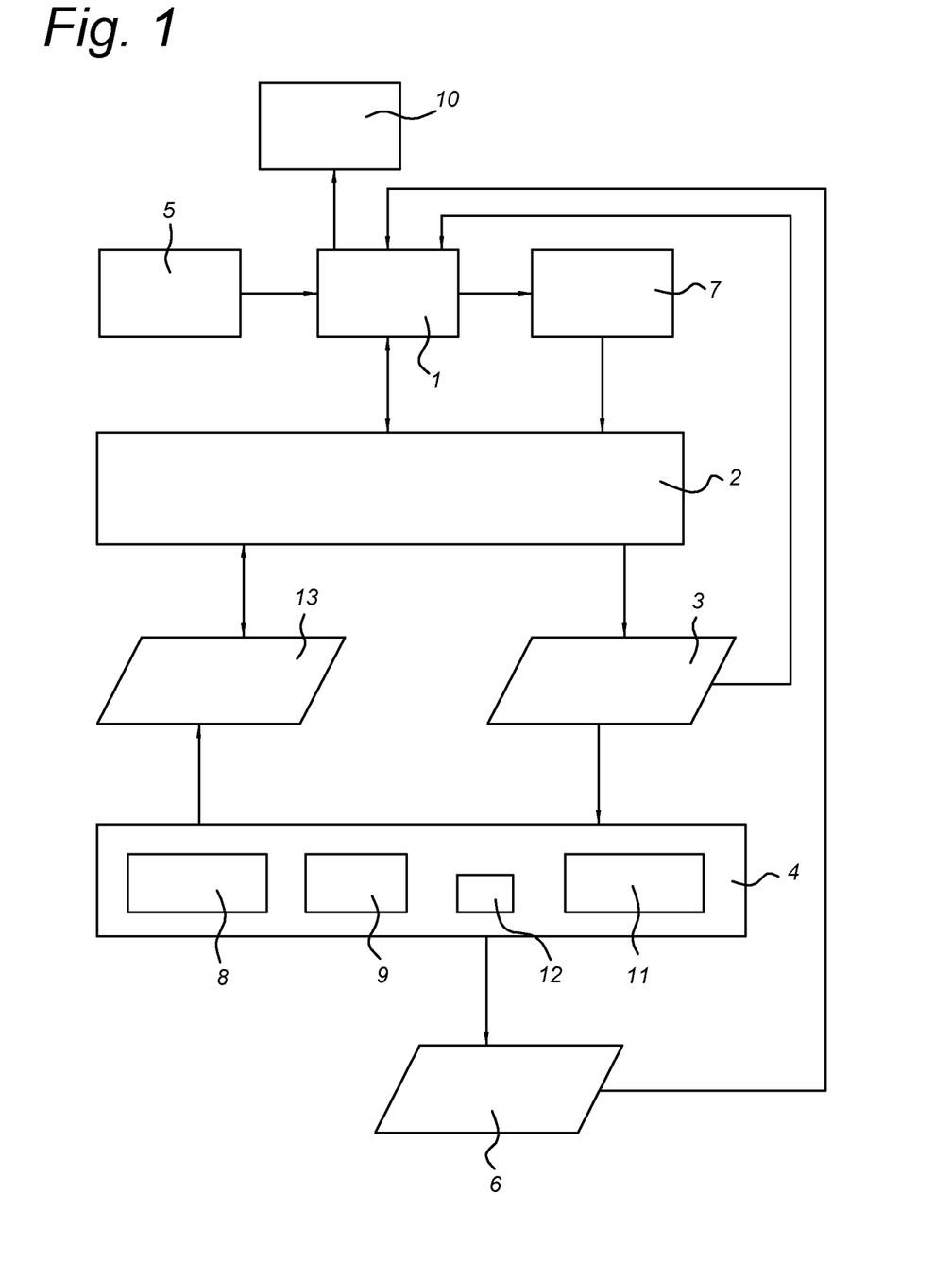
FIG. 1 is a diagram of a system for grouping image annotations.

FIG. 1 illustrates a system for grouping image annotations. The system may be implemented in software or in hardware, as a dedicated electronic circuit. For example, the software may be configured to execute on a computer workstation. Alternatively, the software may be configured to run on a client-server system or any other distributed computer system. The system may comprise a display unit 1 that is configured to control an output signal that is sent to a display device having a display screen 10. The display unit 10 may be configured to display at least one image 5 on a display screen 10. The image 5 may be obtained from an image database, or from any other source, such as an image acquisition device. The image database may be a medical image database, such as a picture archiving and communication system (PACS), or a health record system. The image 5 may be a two-dimensional image or a three-dimensional image or a higher-dimensional image. The image 5 may also be an image series or an image comprising a plurality of image slices. The image may be a radiology image, an x-ray image, a computed tomography (CT) image, a magnetic resonance (MR) image, an echography image, or any other type of image. The image 5 may represent at least one object. This object may be an anatomical structure, or another kind of object.

It will be understood that although the invention is explained herein using the example of a medical imaging system, the invention is not limited thereto. For example, the invention may also be applied to photographic images, wherein the objects are any objects that can be photographed.

The system may comprise a user interface 7 configured to provide controls that may be operated by a user. These controls may comprise buttons, sliders, and the like, that may be operated by means of a mouse, keyboard, and/or a touch screen, for example. The user interface 4 may be used to select an image 5 from the database for viewing and annotating.

The system may further comprise an annotation unit 2 operatively coupled with the user interface 7. The annotation unit 2 may receive signals from the user interface 7 regarding input of an annotation of the image by the user. Specifically, the user interface 7 may allow a user to point to a particular position in the image 5, and create an annotation at that position within the image. Each annotation may comprise geometric information, such as one or more characteristic points or characteristic parameters that determine the position and/or orientation of the annotation. This information is received by the annotation unit 2. Moreover, the annotation unit 2 may receive information of what type of annotation is created, for example what symbol or symbols the annotation comprises. The annotation may comprise a symbol that is superimposed on the image according to the position and/or orientation. The symbol may be an arrow, a line, or any other suitable symbol. The annotation may also comprise a text character or a text string. This text may also be superimposed over the image according to the characteristic parameters. The user interface 7, together with the annotation unit 2, may allow the user to sequentially add annotations to the image 5 with different geometric information, for example at different locations, without being restricted as to where on the image the next annotation will be drawn. The annotation unit 2 may be configured to store the annotations it generates as a plurality of annotations 3, and forward the plurality of annotations 3 to a grouping unit 4.

Alternatively, the annotation unit 2 may be configured to receive the annotation information with annotations of the image 5 from a database 13, for example the image database. A combination is also possible, for example, the user interface 7 may be used to create new annotations, which may be stored by the annotation unit 2 in the database 13. When viewed later, these annotations may be loaded from the database 13, and optionally new annotations may be added by the user via the user interface 7. Both annotations from the database 13 and newly created annotations received via the user interface 7 may be combined in the plurality of annotations 3 that are forwarded to the grouping unit 4.

The grouping unit 4 may be arranged for detecting a group of annotations 6 among the plurality of annotations 3. The grouping unit 4 may be arranged for generating grouping information 6 indicative of which annotations belong to a group. The grouping information 6 may contain information identifying several groups of annotations among the plurality of annotations 3. The grouping information 6 may be stored in the database 13. The grouping of images may be performed in such a way that annotations are grouped if they are related to the same object represented by the image 5. The grouping unit 4 may comprise a heuristic algorithm to determine which annotations belong to the same object. This heuristic algorithm may comprise a plurality of rules. The algorithm and rules may be designed to take into account general properties of objects and images in a particular application domain. Such an application domain could be a particular type of medical image and/or pathology. For example, breast mammography images contain particular objects that have specific dimensions that are different from leg x-ray images. The rules may take this difference into account, by designing the rules to take into account appropriate dimensions of the objects that are annotated with the system. Based on the geometric information and a set of rules that define general properties of geometric relationships of annotations that belong to the same object, the grouping unit 4 detects groups of annotations that belong to the same object in the image. The groups may be detected by the grouping unit 4 with a particular probability or likelihood. It does not need to have certainty.

The display unit 1 may be arranged for displaying an indication of which annotations belong to the group. This indication may be performed by means of coloring or highlighting of annotations, or by displaying an additional symbol. For example, all annotations of a group may be displayed in the same color, and other annotations may be displayed in a different color. The indication may be shown temporarily (for a few seconds, for example) or continuously (as long as the annotations and image are displayed). For example, as soon as an annotation has been created in the user interface 7 and received by the annotation unit 2, the grouping unit 4 may detect whether the newly created annotation forms a group with one or more existing annotations. If the newly created annotation belongs to a group, the indication of the group may be displayed by the display unit 1 as immediate feedback to the user. The user interface 7 may provide an interface to enable a user to overrule the grouping detected by the grouping unit 4. For example, the user may indicate that the newly created annotation does not belong to the group, or the user may indicate that the newly created annotation in fact belongs to some other annotation or an existing group of annotations, if the grouping unit 4 did not detect that group.

As an alternative display option of grouped annotations, it is also possible to (temporarily) hide all annotations that do not belong to a particular group, or to (temporarily) hide all annotations that do belong to a particular group.

Said at least one image, displayed by the display unit 1, may be a plurality of images. These images may have a known geometric relationship, in the sense that coordinates of each image can be transformed into a common coordinate system, so that points in different images can be related to each other. Such coordinate transforms define geometric relationships between the images of the plurality of images. The user interface 7 and annotation unit 2 may be configured to allow the user to create annotations on each of these images of the plurality of images. The grouping unit 4 may be arranged for determining the group of annotations further based on geometric relationships between the plurality of images. This way, annotations of the different images may be grouped if they relate to the same object, as the same object may be depicted in more than one image.

The grouping unit 4 may comprise a geometric unit 8 arranged for determining a geometric relationship between at least two annotations 3 that are associated with different images, based on the geometric relationships between the different images and the geometric information of said at least two annotations.

The annotation unit 2 may further be arranged for receiving time information indicative of a time of input of at least two annotations of the plurality of annotations. The grouping unit 4 may be arranged for performing the detecting of groups of images further based on the time information. For example, a heuristic algorithm may determine a likelihood of two images belonging to the same group, and such heuristic algorithm may increase this likelihood if the two annotations were made quickly one after the other, based on a threshold on the time lapse between two successive annotations.

The grouping unit 4 may comprise a region unit 9 for determining a first region around a first annotation and a second region around a second annotation, based on the geometric information. Such a region may be a smallest rectangle containing the annotation, for example, possibly with a margin around the rectangle. However, other regions are also possible. The grouping unit 4 may further comprise an overlap unit 11 arranged for determining an overlap region of the first region and the second region. This overlap may be determined by comparing the first region and the second region. The grouping unit 4 may be arranged for performing the detecting of the group of annotations based on a size of the overlap region. For example, the size of the overlap region compared to the size of the first region and/or the second region may be used as a criterion. Further detailed example of regions is described elsewhere in this description, with reference to FIG. 4 and FIG. 5.

The geometric information of a first annotation may comprise an indication of a first line and the geometric information of a second annotation may comprise an indication of a second line. Such a line may for example be the linear extension of an arrow or of a line segment. The grouping unit 4 may be arranged for detecting a location of an intersection point of the first line and the second line. This intersection point may be used as an indication of whether the first annotation and the second annotation belong to the same group. For example, if the intersection point is within a predetermined distance from the annotation, the two annotations may be considered to belong to the same group. This may be even more so if the two annotations are arrows and both arrows point towards the intersection point. Such considerations may be formalized using rules to decide whether two annotations belong to the same group. Examples of intersection points are given in FIG. 6.

The annotation unit 2 may be arranged for receiving information regarding input of text annotations and non-text annotations. Herein, a text annotation comprises a text string, and a non-text annotation comprises a non-text symbol. The grouping unit 4 may be arranged for grouping a text annotation with the closest non-text annotation of the plurality of non-text annotations. To this end, the grouping unit 4 may be arranged for detecting a non-text annotation among the non-text annotations that is closest to the text annotation, based on the geometric information.

As described above, the system may be a medical system, said at least one image may comprise a medical image, and said at least one object may comprise an anatomical object. However, this is not a limitation.

Figure 2:
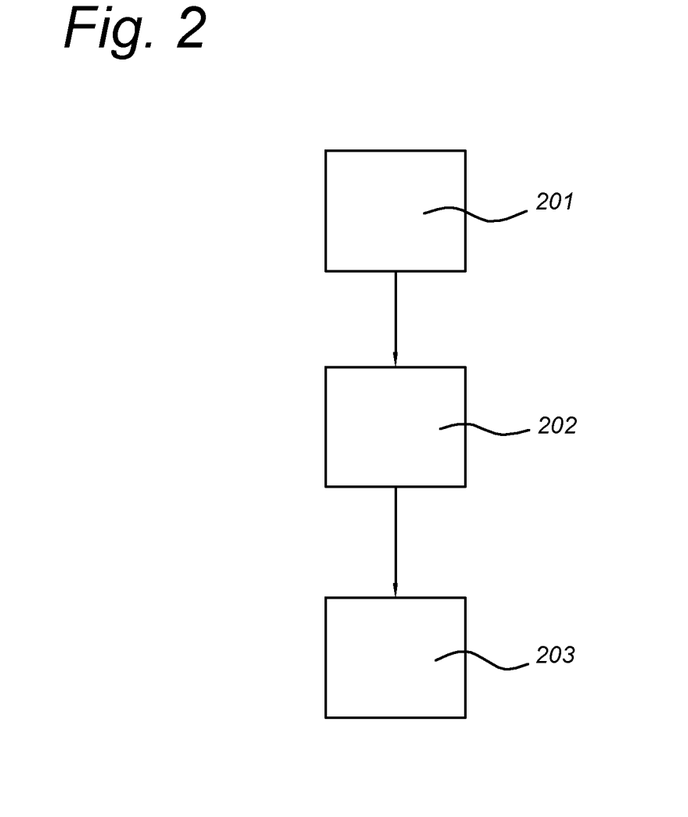
FIG. 2 is a flowchart of a method of grouping image annotations.

FIG. 2 illustrates a method of grouping image annotations. The method may comprise the steps of displaying (step 201), receiving (step 202), and detecting (step 203). More particularly, the step 201 of displaying may comprise displaying at least one image on a display screen. That at least one image may comprise a representation of at least one object.

Step 202 may comprise receiving information regarding input of a plurality of annotations of said at least one image. Each annotation may comprise geometric information relative to an image of said at least one image.

Step 203 may comprise detecting a group of annotations among the plurality of annotations. This detection may be based on the geometric information and a set of rules that define properties of geometric relationships of annotations that belong to the same object.

This method may be modified and/or extended, for example based on the description of the functionality of the system described in this description. The method may be implemented on a computer program product.

Figure 3:
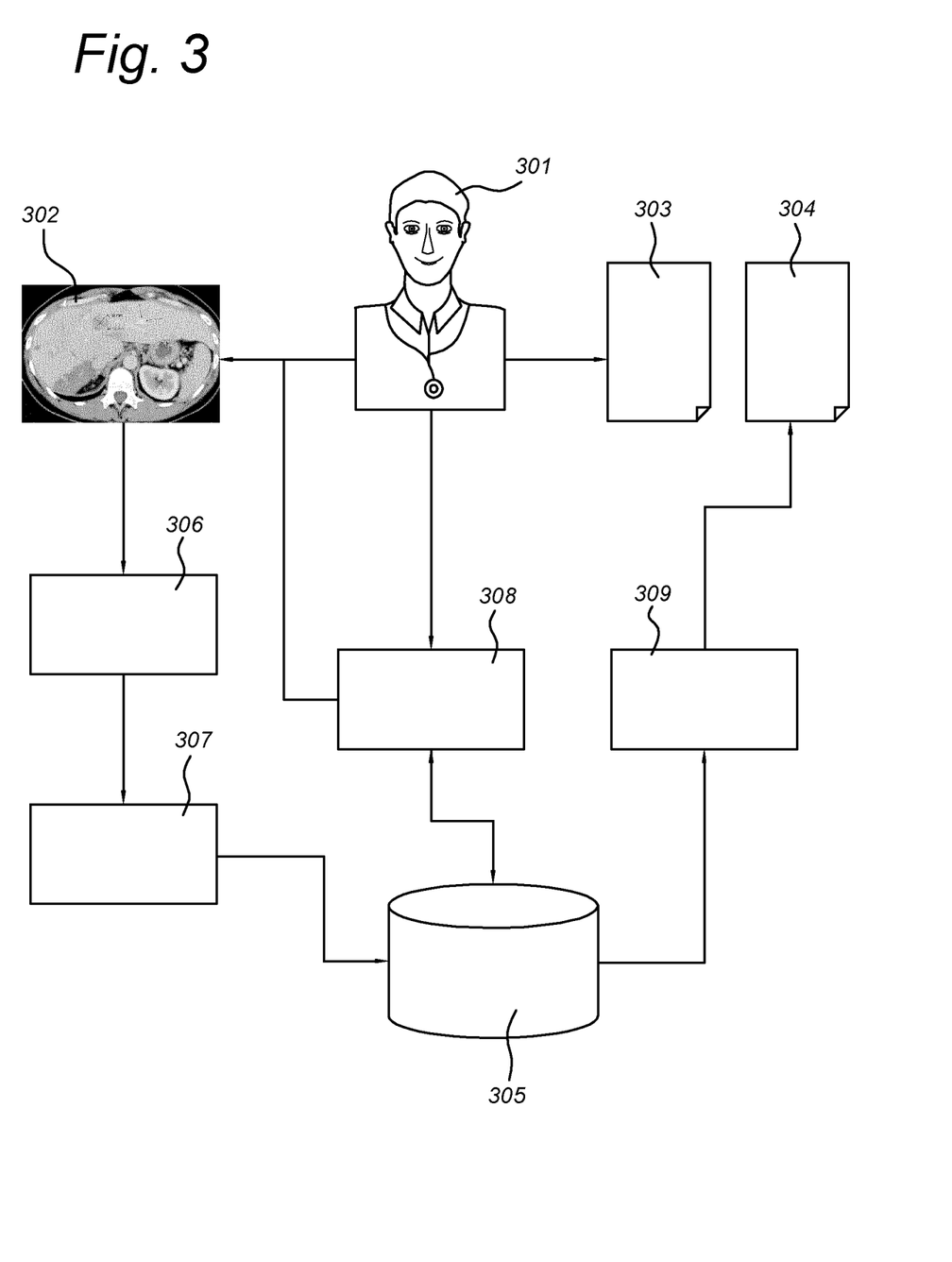
FIG. 3 is a diagram of an alternative embodiment of a system for grouping image annotations.

FIG. 3 illustrates another embodiment of an imaging system that comprises a system for grouping annotations. The system may comprise a viewing environment 302 that displays images from a database or acquisition apparatus (not shown) under control of a user 301. The system may comprise a grouping unit 307 that, given a set of annotations and meta-data, decides which annotations refer to the same physical entity depicted in the image 302, based on the spatial coordinates and/or additional contextual information of the annotation. The output of the grouping unit 307 may comprise a plurality of groups of annotations 305, each group of annotations referring to another physical entity. Normalization unit 309 may be provided to format the list of objects 305 into a machine readable format 304, such as XML, which may for example be attached to a report 303 that was authored by the user 301.

An annotation crawler 306 may be configured to generate input for the grouping unit or consume its output. The annotation crawler 306 may comprise a unit that is connected to the image viewing environment 302 and detects if the user makes an annotation. If an image annotation is detected the annotation crawler 306 may be configured to gather the spatial coordinates of the annotation. These spatial coordinates may comprise a start point and an end point, for example. The spatial coordinates may further comprise a series identifier and/or a slice identifier (in case of a multi-slice image series). The annotation crawler 306 may further collect other contextual information. The annotation crawler 306 sends out the information to the other components of the system, such as the grouping unit 307. The contextual information may include any of a time stamp indicating a time when the annotation was created; an imaging modality used to create the image; a body section imaged; series information (e.g., plane of imaging); patient demographics of the imaged patient; conditions under which the image was viewed (e.g. eye-ball tracking of the user 301 who created the annotations); output of image segmentation software configured to segment the image; and/or annotation behavior patterns.

The system may further comprise a user interaction unit 308. The user interaction unit 308 may be configured to accept a plurality of groups of annotations in standardized format (the machine readable format 304) and display it to the user in a graphical form. This unit may be configured to provide appropriate interaction with the user, for instance adding descriptive labels, making corrections, or sending it to the radiology report.

The input of the grouping unit 307 may comprise a set of annotations furnished with image coordinates. An annotation may comprise the following items of information: Exam series, image number (in case of multi-slice datasets, such as CT and MR), annotation type, a descriptive label attached to the annotation, characteristic points involved in the annotation, time stamp indicative of time of creation of the annotation. The annotation type can be, for example, length measurement, oval, text, angular measurement, or arrow. If available, the grouping unit can be furnished with other contextual information, derived by secondary algorithms. Such information may comprise information relating to points derived from characteristic points of an annotation (e.g., the smallest rectangle or circle around a line). Contextual information by also comprise image segmentation data (e.g., for detecting organs in images). Contextual information can also comprise radiology gaze tracking information provided by eye-tracking software (e.g. for determining if a radiologist was focusing on one area only while creating a plurality of annotations).

The information normalization unit 309 may be configured to consume all information available and standardize it with respect to "frames" or other data structures, such as the Annotation Image Markup extension of XML. The underlying data structure, which may be publicly available or proprietary, may distinguish between several notions including abstracted finding comprising a plurality of annotations, and individual annotations. The information normalization unit 309 may be configured to ensure, through bookkeeping logic, that each piece of annotation information or meta-data is inserted in the right spot in the data structure. As a result a machine looking for one or more pieces of information can automatically find it.

User interaction unit 308 may be configured to display the grouped annotations to the user in an intuitive fashion, allowing the user to make modifications, extensions and correct the consequences of incorrect inference by the grouping unit.

Figure 4:
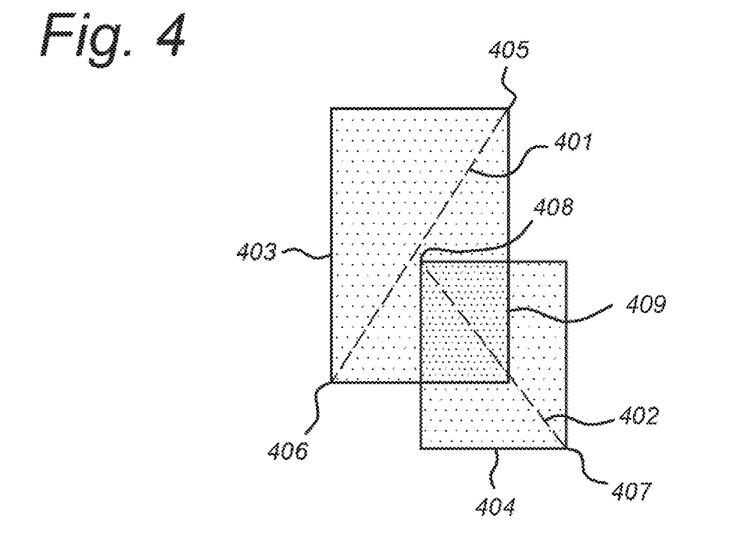
FIG. 4 illustrates two annotations with overlapping regions around the annotations.

FIG. 4 illustrates an example of contextual information that can be used to detect whether two annotations belong to the same group. This may be applied to embodiments of either FIG. 1, FIG. 2, or FIG. 3. For example, consider two annotations 401 and 402 that are line segments. The line segment 401 has end points 405 and 406; line segment 402 has end points 407 and 408. These end points may be examples of 'characteristic points' of the annotations. Different types of annotations may have particular points that may act as characteristic points, wherein the characteristic points of an annotation may be used to represent the location, size, and/or orientation of an annotation. However, other kinds of parameterization of annotations are also possible. The region unit 9 may be configured to determine a first region 403 around the line segment 401, and a second region 404 around the line segment 402. The overlap unit 11 may be configured to determine an overlap region 409, wherein the overlap region 409 is the region where the first region 403 and the second region 404 overlap.

Figure 5:
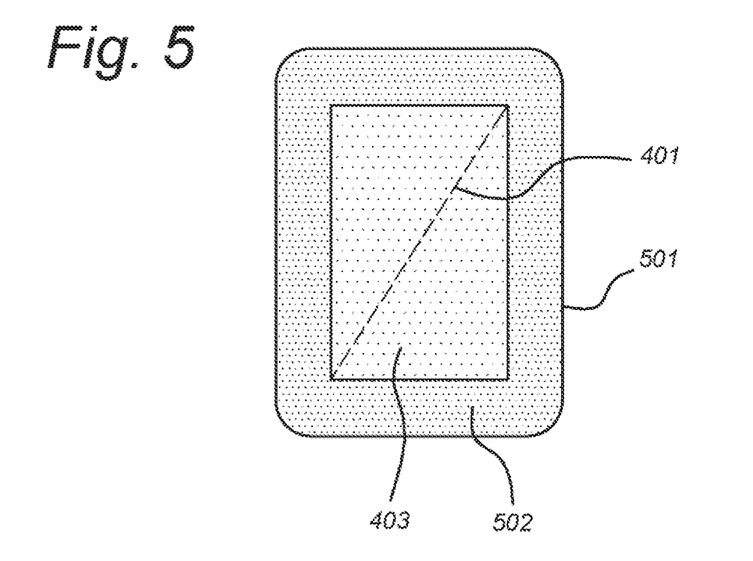
FIG. 5 illustrates an annotation with a region around it.

In the example of FIG. 4, the region is a rectangle with the line segment as a diagonal. FIG. 5 shows an expanded region 501 around the annotation 401. In FIG. 5, the region 501 consists of the rectangle 403 having the line segment 401 as its diagonal and a margin 502 around that rectangle 403. However, FIG. 4 and FIG. 5 only show examples of how the regions 403, 404, 501 and their overlap region 405 may be determined. These regions and overlap region may be determined in a number of different ways (e.g. involving a convex hull), according to the needs of the application.

For instance, the annotations 401 and 402 illustrated in FIG. 4 may represent two measurement annotations. They may be both accompanied by a text annotation, which, in this case, reports the length. Exam series, image number and pixels involved can be obtained from contextual sources. The grouping unit 4 may determine whether these two annotations 401 and 402 belong to the same physical object (shown in the image), based on the overlap 405 of the regions 403, 404 around the annotations 401, 402.

Figure 6:
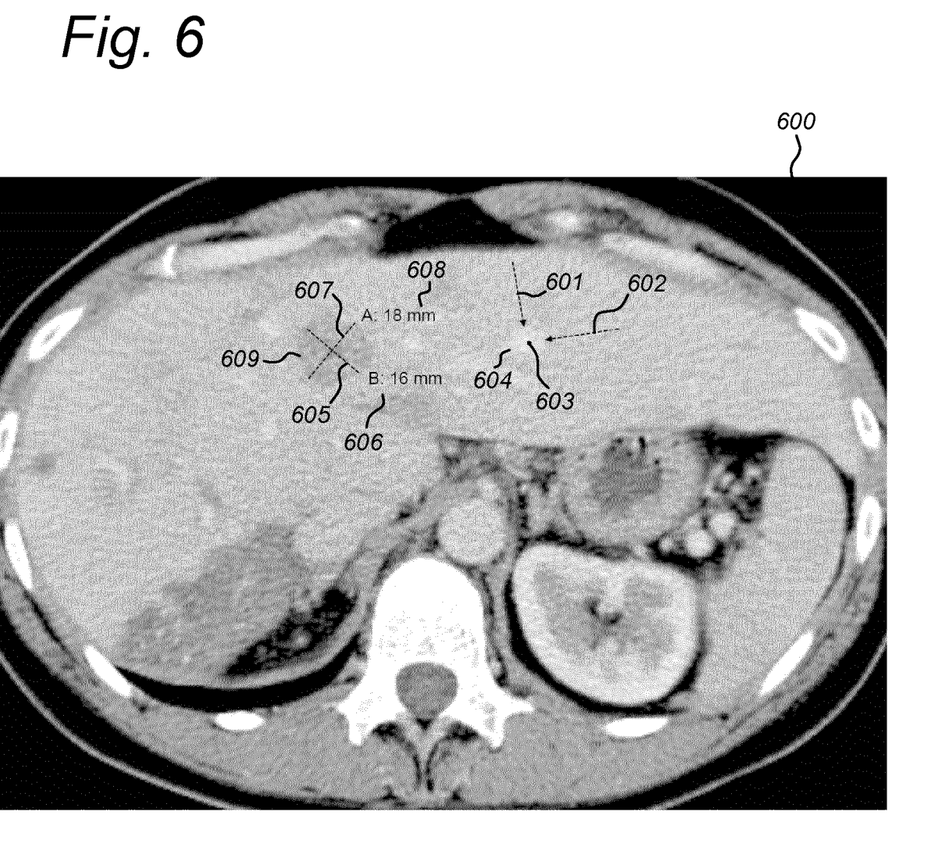
FIG. 6 shows a medical image with several annotations.

FIG. 6 shows a medical image 600 that is an axial slice of a multi-slice image dataset. Two arrow annotations 601 and 602 have been input by the user. The intersection point 603 is the intersection point of the lines that go through the arrows 601 and 602. This intersection point is relatively close to the arrowheads of the arrow annotations 601 and 602. Consequently, the grouping unit 4 may decide that the two arrow annotations 601 and 602 belong to the same object. It can be seen that this conclusion is correct, as both arrow annotations 601 and 602 point to the same object 604.

Two line annotations 605 and 607 of the image 600 define two line segments. These line segments intersect. Applying a rule that intersecting line segments belong to the same group, the grouping unit 4 detects that the line annotations 605 and 607 form a group. Moreover, text annotation 606 is a text string "B: 16 mm". The non-text annotation closest to text annotation 606 is the line annotation 605. Applying a rule that a text annotation is grouped with its nearest non-text annotation, the grouping unit 4 may detect that line annotation 605 and text annotation 606 form a group. Text annotation 608 is a text string "A: 18 mm". Again applying the rule that a text annotation is grouped with its nearest non-text annotation, the grouping unit 4 may detect that line annotation 607 and text annotation 608 form a group. These groups may be joined to determine that annotations 605, 606, 607, and 608 all belong to the same object. In the image object 609 can be recognized, and it is clear that the grouping by the grouping unit 4 is correct.

If the system supports image segmentation, the grouping unit 4 could also receive segmentation information, i.e., geometric information of objects 604 and 609. In this case, the rules may be extended with a rule that an annotation overlapping an object, belongs to that object, and hence, all objects overlapping the same object belong to the same group.

The grouping unit 4 can be implemented using a base of rules 12 that, prioritized appropriately, determine whether any given two or more annotations pertain to the same physical entity. Examples of such rules include the following:

Two intersecting line segments on the same image belong to the same physical entity.

The regions around two annotations overlap, and the area of the overlap region compared to the sum of the areas of the regions around the two annotations exceeds a certain threshold. The region around an annotation can be, for example, a smallest rectangle that comprises an annotation, the smallest rectangle being optionally expanded with a margin. However, other ways to define a region around an annotation are also possible, for example a convex hull around an annotation.

If two line measurements on the same image are nearby (for example, 1 cm), and were made within a particular time interval (for example, 2 seconds), then they belong to the same entity.

Any two annotations that are within a predetermined distance from each other (for example, maximum 2 cm apart) and that were made in such a way that the user did not consult another slice in between drawing these two annotations, belong to the same physical entity. To determine this, the grouping unit 4 may monitor the user interface 4 to determine whether other slices are consulted in between the creation of two annotations.

If two annotations were made close to each other, within a predetermined distance (for example, maximum 1 cm) on a organ of a particular size (for example, the organ is 2 cm in maximal diameter) then they belong together. Image segmentation may be employed to determine the location and size of the organ.

If the intersection point of the two lines through two arrow annotations made on the same image is pointed at by both arrow heads and both arrow heads are within a predetermined distance (for example, 2 cm) away from the intersection point, then the arrow annotations belong to the same group.

A text annotation belongs to the nearest non-text annotation.

It will be understood that the above rules are only examples of useful rules. They are not intended to limit the scope of the invention. Moreover, Boolean combinations of the above rules can be envisioned for increased precision. For example, a rule could be defined as "If two line segments intersect and they were made within a 5 seconds interval, then they belong to the same physical entity".

The grouping unit 4 can also be utilized to correlate annotations across images. In neurology magnetic resonance (MR) exams, and other types of exams, it is fairly standard that annotations are made in differently oriented reconstructed planes. If a radiologist wants to assess the volume of a lesion, for instance, the radiologist can make measurements in three dimensions, using two different reconstructed planes. The two different reconstructed planes may have a known geometric relationship, so that points in both reconstructed planes can be identified using a common three-dimensional coordinate system. This geometric relationship may be known from the reconstruction method or by using image registration techniques, for example. For example, consider two annotations made by a user, one annotation in the first reconstructed plane and one annotation in the second reconstructed plane. These annotations may be line segments or distance measurements between two points of the respective plane. Such a distance measurement also represents a line segment that connects the two points of the measurement. A rule may be set to determine whether two such annotations in different reconstructed planes belong to the same group. Such a rule may for example evaluate whether there is a connecting line segment that connects the two line segments and that is orthogonal to both line segments. If such a connecting line segment exists, the rule may prescribe that the two annotations belong to the same group. Alternatively, a rule may prescribe that the two annotations belong to the same group if such a connecting line segment exists and the length of the connecting line segment compared to the length of the line segment of either or both of the annotations is below a predetermined threshold. Both rules may further prescribe that the two annotations also belong to the same group if their line segments intersect.

For example, when one measurement is made in an axial plane and the other is made in a sagittal plane, i.e., on differently oriented planes, it may be determined that the annotations corresponding to the measurements are related based on their voxel-based geometric relationship and thus relate to the same clinical finding. Accordingly, the annotations may be correlated in that they are detected as belonging to a same group.

If a registration unit (not shown) is present to register two exam series, the set of rules can be applied as if the annotations were made on the same series. For example, two image series made of the same patient may be registered to obtain the geometric relationship between the two image series. Annotations made in respective ones of these two image series may be grouped using the geometric relationship between the two image series.

Alternatively, annotations made with respect to corresponding slices of different image series may belong together if they are positioned at similar coordinates within the images, and particularly so if they are further comparable in size and/or shape.

Giving instant feedback to the user as to which annotations belong together as the user creates the annotations can be especially useful. To this end, the grouping unit 4 (or 307) can be configured to run permanently in the background. When a new annotation is created, the annotation unit 2 may trigger the grouping unit 4. If the grouping unit groups the newly created annotation with one or more existing annotations, the group of annotations may be highlighted by the display unit 1 or viewing environment 302. This highlighting may be done for a short period, or continuously. The moment a grouping of two annotations is indicated by the display unit 1 or viewing environment 302, the user can undo the grouping by means of a suitable user input, such as a gesture with the mouse or a hotkey on the keyboard.

The system can be utilized to build a patient-specific repository of findings, which are defined on a higher level than the individual image annotations. A finding could be associated with a group of annotations that relate to a physical entity. Each finding can be traced back to image coordinates through its annotations. Such a repository can be used in several ways, including efficient reporting, populating a clinical database, driving workflow if patient represents, conducting staging analysis on findings, or instant navigation between abstract finding objects and images.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be subdivided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a flash drive or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or to be used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for grouping image annotations, comprising
   a display device that displays a plurality of medical images relating to a subject on a display screen, wherein the plurality of medical images comprises a representation of at least one anatomical object;
   a memory device that stores annotations associated with the plurality of medical images, each annotation comprising geometric information; and
   a processing device that:
      receives the plurality of annotations from the memory device;
      detects a group of annotations of the plurality of annotations that are related to a single anatomical object from the plurality of annotations; and
      displays, on the display device, an identification of the group of annotations that are related to the single anatomical object;
   wherein the processing device detects the group of annotations by processing the geometric information of each annotation based on a set of rules that define properties of geometric relationships of annotations that belong to a common anatomical object, and based on geometric relationships among the plurality of medical images.

2. The system of claim 1, wherein the geometric information comprises one or more of: a position of the annotation relative to the at least one medical image, an orientation of the annotation with respect to the at least one medical image, and a shape of the annotation.

3. The system of claim 1, wherein the processing device determines a geometric relationship between at least two annotations that are associated with different medical images of the plurality of images, based on the geometric relationship between the different medical images and the geometric information of the at least two annotations.

4. The system of claim 1,
   wherein the processing device receives time information indicative of a time of input of at least two annotations of the plurality of annotations, and
   wherein the processing device detects the group of annotations based on the time information.

5. The system of claim 1,
   wherein the processing system determines a first region around a first annotation and a second region around a second annotation, based on the geometric information, and determines an overlap region of the first region and the second region, and
   wherein the processing device determines the group of annotations based on a size of the overlap region.

6. The system of claim 1, wherein the geometric information of a first annotation comprises an indication of a first line and the geometric information of a second annotation comprises an indication of a second line, and wherein the processing device determines whether the first annotation and the second annotation belong to the group of annotations based on a location of an intersection point of the first line and the second line.

7. The system of claim 1, wherein the plurality of annotations include a text annotation comprising a text string, and a plurality of non-text annotations, wherein each non-text annotation comprises a symbol, and wherein the processing device detects a non-text annotation that is closest to the text annotation, based on the geometric information, and identifies the text annotation and the non-text annotation of the plurality of non-text annotations that is closest to the text annotation as members of the group of annotations.

8. The system of claim 1, wherein the plurality of medical images comprises differently oriented reconstructed planes having a known geometric relationship to each other.

9. The system of claim 1, wherein the plurality of medical images comprise two images series, and wherein the processing device registers the two image series to obtain the geometric relationship between the two image series.

10. The system of claim 9, wherein the processing device detects the group of annotations based on annotations being positioned at similar coordinates in the plurality of medical images based on the geometric relationship between the two image series.

11. The system of claim 1, wherein the set of rules define properties of geometric relationships of annotations that belong to a single clinical finding.

12. A workstation comprising the system of claim 1.

13. A method of grouping image annotations, comprising
   displaying a plurality of medical images relating to a subject on a display screen, wherein the plurality of medical images comprises a-representations of at least one anatomical object;
   receiving a plurality of annotations related to the plurality of medical images, each annotation comprising geometric information;
   detecting a group of annotations of the plurality of annotations that are related to a single anatomical object among the plurality of annotations; and
   displaying an indication of the group of annotations that are related to the single anatomical object in the plurality of medical images:

wherein the detecting includes processing the geometric information based on a set of rules that define properties of geometric relationships of annotations that belong to common anatomical object, and based on a geometric relationship between the plurality of medical images.

14. A non-transitory computer-readable medium comprising a computer program product that, when executed by a processor system causes the processor system to:
   display a plurality of medical images relating to a subject on a display screen, wherein the plurality of medical images comprises representations of at least one anatomical object;
   receive a plurality of annotations related to the plurality of medical images from a memory device, each annotation comprising geometric information:
   detect a group of annotations of the plurality of annotations that are related to a single anatomical object among the plurality of annotations; and
   display, on the display screen, an indication of the group of annotations that are related to the single anatomical object in the plurality of medical images:
   wherein the computer program product causes the processing system to detect the group of annotations by processing the geometric information based on a set of rules that define properties of geometric relationships of annotations that belong to a common anatomical object, and based on a geometric relationship between the plurality of medical images.

15. The medium of claim 14, wherein the geometric information comprises one or more of: a position of the annotation relative to the at least one medical image, an orientation of the annotation with respect to the at least one medical image, and a shape of the annotation.

16. The medium of claim 14, wherein the program causes the processor system to determine a geometric relationship between at least two annotations that are associated with different medical images of the plurality of images, based on the geometric relationship between the different medical images and the geometric information of the at least two annotations.

17. The medium of claim 14, wherein the program causes the processor system to:
   determine a first region around a first annotation and a second region around a second annotation, based on the geometric information,
   determine an overlap region of the first region and the second region, and
   determine the group of annotations based on a size of the overlap region.

18. The medium of claim 14, wherein the geometric information of a first annotation comprises an indication of a first line and the geometric information of a second annotation comprises an indication of a second line, and wherein the program causes the processor system to determine whether the first annotation and the second annotation belong to the group of annotations based on a location of an intersection point of the first line and the second line.

19. The system of claim 1, wherein the processing device:
   receives, from a user, input relating to a medical image of the plurality of medical images,
   creates, from the input, one or more additional annotations relating to an anatomical image in the medical image, wherein the additional annotation includes geometric information, and
   stores the one or more additional annotations in the memory device.

20. The method of claim 13, comprising:
   receiving, from a user, input relating to a medical image of the plurality of medical images,
   creating, from the input, one or more additional annotations relating to an anatomical image in the medical image, wherein the additional annotation includes geometric information, and
   adding the one or more additional annotations to the plurality of annotations.

* * * * *